US010272992B2

(12) United States Patent
Cox et al.

(10) Patent No.: US 10,272,992 B2
(45) Date of Patent: Apr. 30, 2019

(54) CLUTCH ASSEMBLY FOR AIRCRAFT DRIVE WHEEL DRIVE SYSTEM

(71) Applicant: Borealis Technical Limited, North Plains, OR (US)

(72) Inventors: Isaiah W. Cox, London (GB); Scott Perkins, Kent, WA (US); David Stoltze, Warren, MI (US)

(73) Assignee: Borealis Technical Limited, Gibraltar (GI)

(*) Notice: Subject to any disclaimer, the term of this patent is extended or adjusted under 35 U.S.C. 154(b) by 560 days.

(21) Appl. No.: 14/929,328

(22) Filed: Oct. 31, 2015

(65) Prior Publication Data
US 2017/0121014 A1 May 4, 2017

(51) Int. Cl.
B64C 25/40 (2006.01)
B60K 7/00 (2006.01)
F16D 41/06 (2006.01)
F16D 41/12 (2006.01)
B60K 17/14 (2006.01)
B60K 17/04 (2006.01)
B60K 17/02 (2006.01)

(52) U.S. Cl.
CPC .......... B64C 25/405 (2013.01); B60K 7/0007 (2013.01); B60K 17/02 (2013.01); B60K 17/043 (2013.01); B60K 17/145 (2013.01); F16D 41/06 (2013.01); F16D 41/12 (2013.01); F16D 2041/0603 (2013.01); Y02T 50/823 (2013.01)

(58) Field of Classification Search
CPC .... B64C 25/405; B60K 17/02; B60K 17/043; B60K 17/145; B60K 7/0007; F16D 41/12; F16D 41/06; F16D 2041/0603; G05D 1/0202; Y02T 50/823
See application file for complete search history.

(56) References Cited

U.S. PATENT DOCUMENTS

| 2,430,163 A | 11/1947 | Dever |
| 3,075,623 A | 1/1963 | Lund |
| 3,598,213 A * | 8/1971 | Giese ..................... F16D 41/07 192/41 A |

(Continued)

FOREIGN PATENT DOCUMENTS

GB 2457144 A 4/2007

Primary Examiner — Assres H Woldemaryam

(57) ABSTRACT

A clutch assembly for an aircraft drive wheel drive system to move an aircraft independently on the ground is provided. The clutch is mounted within an aircraft drive wheel to be operatively engaged and disengaged to selectively actuate a roller traction or other drive system to activate a non-engine drive means to drive the wheel and the aircraft. One embodiment of the clutch assembly includes a plurality of pivoted sprag elements selectively activatable to transmit torque between inner and outer clutch members and activate the drive wheel drive system. The clutch assembly may also include mating crown gear and straight gear elements integrated with the drive system to reduce stresses on the drive system as the drive means is actuated. Various arrangements of sprags and clutch assembly components may be provided to monitor and selectively control disengagement of the clutch assembly and communicate disengagement to selectively prevent drive system actuation.

10 Claims, 3 Drawing Sheets

(56) References Cited

U.S. PATENT DOCUMENTS

| | | | |
|---|---|---|---|
| 3,599,767 A * | 8/1971 | Sederquist | F16D 41/07 |
| | | | 192/41 A |
| 3,711,043 A * | 1/1973 | Cameron-Johnson | |
| | | | B64C 25/36 |
| | | | 180/55 |
| 3,977,631 A | 8/1976 | Jenny | |
| 4,617,838 A | 10/1986 | Anderson | |
| 6,657,334 B1 | 12/2003 | Edelson | |
| 6,838,791 B2 | 1/2005 | Edelson | |
| 7,116,019 B2 | 10/2006 | Edelson | |
| 7,226,018 B2 | 6/2007 | Sullivan | |
| 7,445,178 B2 | 11/2008 | McCoskey et al. | |
| 7,469,858 B2 | 12/2008 | Edelson | |
| 7,661,329 B2 | 2/2010 | Cali et al. | |
| 7,891,609 B2 | 2/2011 | Cox | |
| 7,975,960 B2 | 7/2011 | Cox | |
| 8,109,463 B2 | 2/2012 | Cox | |
| 2006/0273686 A1 | 12/2006 | Edelson et al. | |
| 2010/0288592 A1* | 11/2010 | Papania | F16D 41/12 |
| | | | 192/45.1 |
| 2013/0200210 A1* | 8/2013 | Oswald | B64C 25/405 |
| | | | 244/50 |
| 2015/0204397 A1* | 7/2015 | Edelson | B64C 25/405 |
| | | | 192/41 A |
| 2015/0217861 A1* | 8/2015 | Cox | B64C 25/405 |
| | | | 301/6.2 |
| 2016/0194077 A1* | 7/2016 | Cox | B64C 25/405 |
| | | | 244/103 S |
| 2016/0358484 A1* | 12/2016 | Vana | B64D 47/06 |

* cited by examiner

CLUTCH ASSEMBLY FOR AIRCRAFT DRIVE WHEEL DRIVE SYSTEM

TECHNICAL FIELD

The present invention relates generally to clutch assemblies for drive wheels and particularly to a clutch assembly for an aircraft drive wheel drive system with a drive-actuated drive means capable of moving an aircraft autonomously during ground operations.

BACKGROUND OF THE INVENTION

As air travel has increased over the past decades, airport facilities have become more crowded and congested. Minimizing the time between the arrival of an aircraft and its departure to maintain an airline's flight schedule, and also to make a gate or parking location available without delay to an incoming aircraft, has become a high priority in the management of airport ground operations. The safe and efficient ground movement of a large number of aircraft simultaneously into and out of ramp and gate areas has become increasingly important. As airline fuel costs and safety concerns and regulations have increased, the airline industry is beginning to acknowledge that continuing to use an aircraft's main engines to move aircraft during ground operations is no longer the best option. The delays, costs, and other challenges to timely and efficient aircraft pushback from airport terminals associated with the use of tugs and tow vehicles makes this type of aircraft ground movement an unattractive alternative to the use of an aircraft's main engines to move an aircraft on the ground. Restricted use of an aircraft's engines on low power during arrival at or departure from a gate is an additional, although problematic, option. Not only does such engine use consume fuel, it is also burns fuel inefficiently and produces engine exhaust that contains microparticles and other products of incomplete combustion. Operating aircraft engines, moreover, are noisy, and the associated safety hazards of jet blast and engine ingestion in congested gate and ramp areas are significant concerns that cannot be overlooked.

The use of a drive means, such as a motor structure, integrally mounted with a wheel to rotate the wheel of an aircraft has been proposed. The use of such a structure should move an aircraft independently and efficiently on the ground without reliance on the aircraft's main engines. U.S. Pat. No. 2,430,163 to Dever; U.S. Pat. No. 3,977,631 to Jenny; and U.S. Pat. No. 7,226,018 to Sullivan, for example, describe various drive means and motors intended to drive aircraft during ground operations. None of the foregoing patents, however, suggests a roller traction or like drive mechanism activated by a clutch to actuate drive means intended to move an aircraft independently and efficiently on the ground.

U.S. Pat. No. 7,469,858 to Edelson; U.S. Pat. No. 7,891,609 to Cox; U.S. Pat. No. 7,975,960 to Cox; and U.S. Pat. No. 8,109,463 to Cox et al., owned in common with the present invention, describe aircraft drive systems that use electric drive motors to power aircraft wheels and move an aircraft on the ground without reliance on aircraft main engines or external vehicles. While the drive means described in these patents and applications can effectively move an aircraft autonomously during ground operations, it is not suggested that the drive means could be driven or actuated by clutch-activated roller traction or like drive systems. None of the foregoing art, moreover, recognizes the significant improvements in drive means operating efficiency possible when gearing systems are replaced by clutch-activated roller traction or similar drive systems to actuate drive means that move aircraft autonomously during ground operations.

The drive means currently proposed to drive aircraft on the ground typically rely on gearing systems that operate with the drive means to drive an aircraft wheel and, thus, the aircraft. Traction drives, such as that described in U.S. Pat. No. 4,617,838 to Anderson, available from Nastec, Inc. of Cleveland, Ohio, which relies on ball bearings, can be used to replace gears in some contexts. Adapting roller or traction drive systems to replace gearing and/or gear systems in an aircraft drive wheel to actuate drive means that independently drive an aircraft drive wheel has not been suggested, nor has the use of a clutch assembly to activate such roller traction drive systems been mentioned.

Many types of vehicle clutch assemblies are well known in the art. U.S. Pat. No. 3,075,623 to Lund; U.S. Pat. No. 3,599,767 to Soderquist; and U.S. Pat. No. 7,661,329 to Cali et al, for example, describe clutch assemblies incorporating sprag or pawl elements that may transmit torque between races or rotatable elements depending, in part, on their relative directions of rotation. Neither these clutch designs nor other commonly available similar clutch designs are sufficiently robust to function effectively and reliably in an aircraft drive wheel system to engage a drive system and actuate a drive means as required to drive an aircraft autonomously during ground operations. McCoskey et al. suggests a dual activated cone mechanism or a reverse sprag mechanism that may be used when overrunning in forward and locking in reverse is desired in connection with wheel motors in a powered nose aircraft wheel system in U.S. Pat. No. 7,445,178. McCoskey et al. does not teach a safe overrunning bidirectional clutch assembly for an aircraft drive wheel drive system that includes sprag or pawl elements designed and configured to prevent improper engagement of the clutch assembly when an aircraft is driven independently on the ground.

A need exists, therefore, for an effective and reliable clutch assembly with engagement elements having configurations specifically designed to selectively engage and transfer torque to an aircraft drive wheel roller traction or other drive system with a highly efficient drive system-actuated non-engine drive means that drives an aircraft drive wheel to move the aircraft autonomously on the ground without reliance on the aircraft's main engines or external ground vehicles.

SUMMARY OF THE INVENTION

It is a primary object of the present invention, therefore, to provide a clutch assembly with engagement elements having configurations specifically designed to selectively engage and transfer torque to an aircraft drive wheel roller traction or other drive system with a highly efficient drive system-actuated non-engine drive means that effectively drives an aircraft drive wheel to move the aircraft autonomously on the ground without reliance on the aircraft's main engines or external ground vehicles.

It is another object of the present invention to provide a clutch assembly designed to be integrated within an aircraft drive wheel drive system in selective operative engagement or disengagement with a drive system actuating a non-engine drive means capable of driving an aircraft wheel and, therefore, an aircraft, independently during ground operations.

It is another object of the present invention to provide a clutch assembly designed to be integrated within an aircraft drive wheel drive system in selective operative engagement or disengagement with a roller traction drive system actuating a non-engine drive means capable of driving an aircraft wheel and, therefore, an aircraft, independently during ground operations.

It is an additional object of the present invention to provide a clutch assembly for an aircraft drive wheel drive system that includes a plurality of pawl or sprag engagement elements mounted and configured to prevent improper engagement of the clutch assembly during operation of a drive system to drive the aircraft during ground operations.

It is a further object of the present invention to provide a clutch assembly for an aircraft drive wheel drive system that includes a safe overrunning bidirectional clutch with a plurality of pawl or sprag elements configured to interact electrically with each other and with a sensor to automatically monitor and indicate engagement and disengagement of the clutch assembly during operation of the drive assembly.

It is yet another object of the present invention to provide a clutch assembly for an aircraft drive wheel drive assembly designed to disengage a roller traction or other type of drive system so that the drive system is unable to actuate a non-engine drive means driving the aircraft drive wheel when predetermined selected operating or environmental conditions exist.

It is yet a further object of the present invention to provide a clutch assembly for an aircraft drive wheel drive system including engagement elements capable of withstanding torque in excess of a maximum expected torque for the system.

In accordance with the aforesaid objects, a clutch assembly is provided to operate with an aircraft drive wheel drive assembly that includes a non-engine drive means actuated by a roller traction or other drive system to drive an aircraft wheel and move the aircraft autonomously or independently on the ground without reliance on the aircraft's engines or external vehicles. The clutch assembly is mounted within the aircraft drive wheel where a clutch element can be selectively engaged and/or disengaged to control torque transmission to the drive system and, therefore, selectively actuate the non-engine drive means to drive the aircraft drive wheel. One embodiment of a clutch assembly suitable for this purpose includes a plurality of pawl or sprag elements movably positioned between spaced inner and outer clutch members and/or the aircraft wheel and configured to transmit torque between these elements and thereby activate a drive assembly, which then actuates an aircraft wheel non-engine drive means to drive the aircraft to move the aircraft on the ground. The clutch assembly may also be configured to include mating crown gear and straight gear elements integrated with a drive assembly output member to activate the drive assembly to actuate the non-engine drive means to drive the drive wheel and drive the aircraft. The clutch assembly may further include sensor elements in communication with a controller that monitors disengagement of one arrangement of sprags in the assembly so that engagement of the clutch assembly can be prevented under conditions when actuation of the non-engine drive means should be avoided. A method for transferring torque through the clutch assembly of the present invention is also provided.

Other objects and advantages will be apparent from the following description, claims, and drawings.

DESCRIPTION OF THE INVENTION

The benefits of being able to efficiently and safely move an aircraft during ground operations without reliance on the aircraft's main engines or external vehicles have long been recognized. Actually achieving these benefits, however, has proved challenging. Applicant's previously proposed aircraft wheel non-engine drive means have been demonstrated to effectively power drive wheels and move aircraft on the ground and, thus, can enable aircraft operators to achieve the advantages of autonomous ground movement. The present invention improves the capabilities of Applicant's original aircraft drive wheel drive system and expands the advantages possible when aircraft can be driven during ground operations by controllable non-engine drive means independently of the aircraft's main engines and external ground vehicles. These advantages and improvements are achieved, in large part, by the design of an aircraft drive wheel drive system that incorporates a clutch assembly-activated drive system to control operation of the non-engine drive means.

Figure 1:
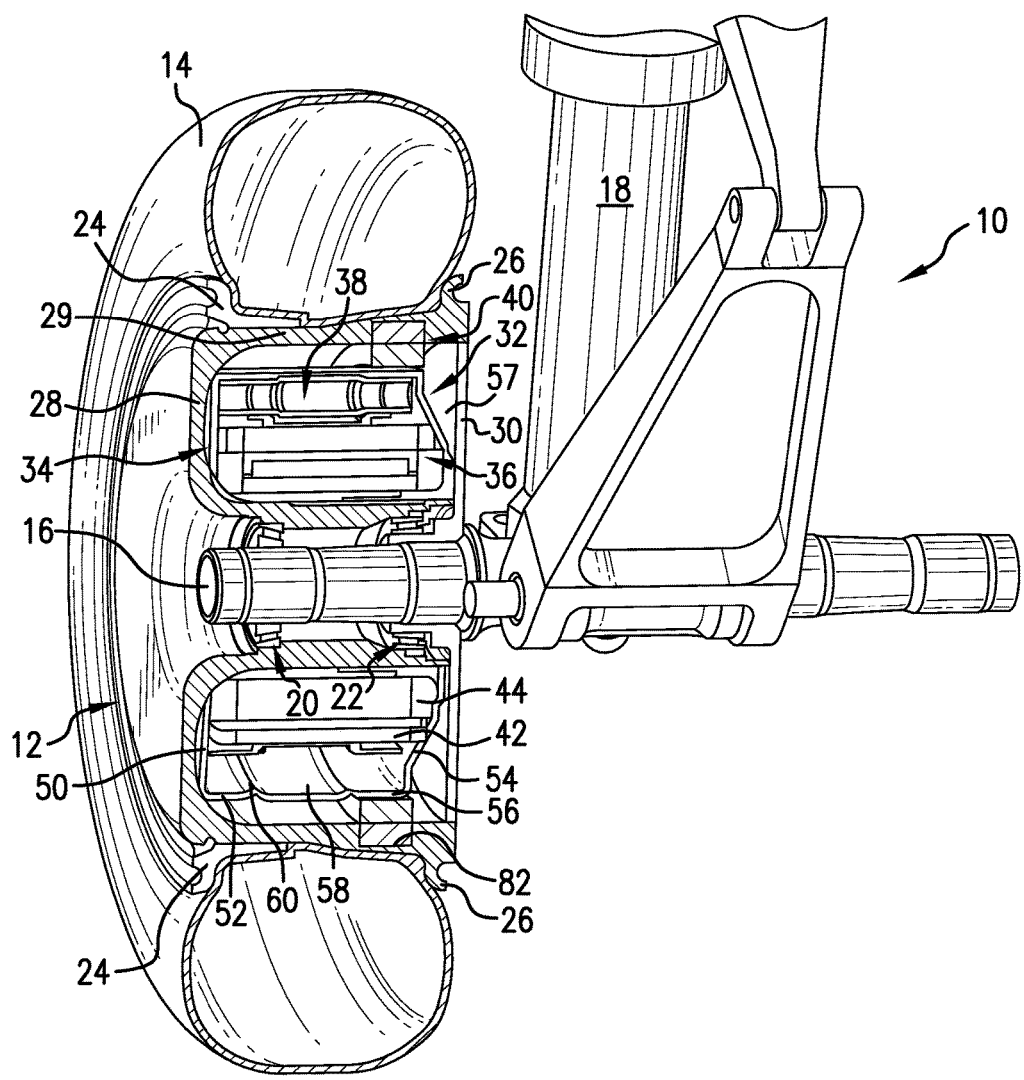
FIG. 1 is a cross-sectional perspective schematic view of a portion of an aircraft landing gear and a landing gear drive wheel showing the clutch assembly of the present invention mounted within an aircraft drive wheel with a clutch-activated drive system and a non-engine drive means.

Referring to the drawings, FIG. 1 shows, in cross-sectional perspective view, a portion of an aircraft landing gear 10 and a landing gear wheel 12 with an aircraft drive wheel drive system, including a clutch assembly according to the present invention, mounted within the landing gear wheel. Although only one landing gear wheel is shown in detail, it is contemplated that one or more nose landing gear wheels, one or more main landing gear wheels, or a combination of nose and main landing gear wheels could be equipped with clutch assemblies in drive wheel systems as described herein. In one possible arrangement, for example, equipping both wheels in a two-wheel nose landing gear with an aircraft drive wheel drive system as described herein provides the capability not only to effectively move the aircraft on the ground, but also to differentially steer and brake the aircraft by selective clutch-controlled activation of the drive means of each wheel.

A tire 14 is shown mounted on the wheel 12. The wheel 12 and tire 14 are rotatably mounted on an axle 16 attached to the landing gear 10. The landing gear 10 includes a central piston 18 and other standard landing gear structures (not identified) typically found in an aircraft nose or main wheel landing gear. The wheel 12 is rotatably supported on the axle 16 by support structures, such as, for example, the bearing arrangements 20 and 22 shown adjacent to the axle 16. Other suitable support structures or bearings may also be used for this purpose. The wheel 12 preferably has the two part configuration shown in FIG. 1, although other wheel designs may also be employed.

Removal and remounting of the tire 12 is facilitated by providing a demountable tire flange 24, preferably on an outboard side of the wheel 12, so that it can be removed when necessary. A stationary tire flange 26 is provided to hold an opposite side of the tire 14. The stationary tire flange is preferably integrally formed with an upper portion 29 of a substantially "C"-shaped outboard wheel wall section 28 that forms most of the wheel. A smaller inboard wheel wall section 30 connects to the outboard wheel section 28 to define a maximum space or volume within the wheel 12 where components of a drive wheel drive system can be mounted. To provide a clearer view of the main components of a preferred aircraft drive wheel system, elements, such as, for example, the tire valve stem, are not shown.

Figure 2:
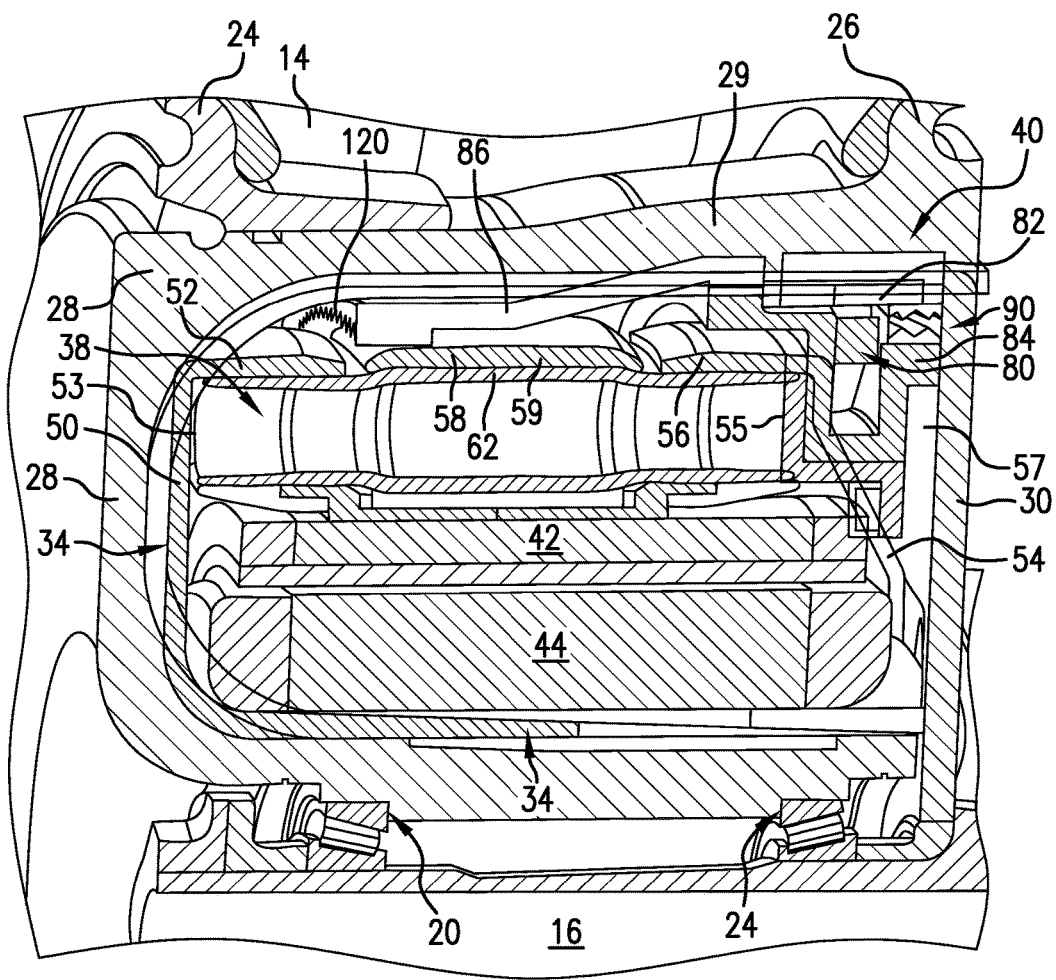
FIG. 2 is a diagrammatic view of a portion of the aircraft landing gear drive wheel of FIG. 1, showing the relative locations of the clutch assembly of the present invention, a roller traction drive system, and a non-engine drive means within a space in the wheel defined to operatively contain these system components.

A preferred configuration and arrangement of components of a preferred drive wheel drive system 32, including the clutch assembly of the present invention, is shown in FIGS. 1 and 2. Other functionally equivalent arrangements and configurations are also contemplated to be within the scope of the present invention. In the preferred configuration shown, the components of the drive system 32 are enclosed within a system housing 34 that is shaped to fit completely within the space and volume created by the arrangement of the respective outboard and inboard wall sections 28 and 30 of the wheel 12. The main elements of the drive wheel drive system include a non-engine drive means 36, a drive system 38, and a clutch assembly 40, preferably positioned as shown in FIGS. 1 and 2, although other suitable positions and locations may also be used. The components of the non-engine drive means 36 and the drive system 38 may be positioned within the system housing 34 so that the outboard edges of these structures are in substantially parallel alignment with the outboard wheel wall 28 to have the asymmetrical configuration shown. Other arrangements that produce other system housing configurations, including a symmetric configuration, may also be used and are contemplated to be within the scope of the present invention.

A preferred non-engine drive means 36 may be an electric motor that includes a rotating element, such as a rotor 42, and a stationary element, such as a stator 44. The rotor 42 may be located externally of the stator 44, as shown, but other drive means component arrangements could also be used and are contemplated to be within the scope of the present invention. For example, the positions of the rotor 42 and stator 44 could be reversed so that the rotor is internal to the stator.

The preferred non-engine drive means 36 may be an electric motor assembly that is capable of operating at high torque and could be any one of a number of suitable designs. An example of one type of electric motor assembly that could be used effectively in the present system is an inside-out electric motor in which the rotor can be internal to or external to the stator, such as that shown and described in U.S. Patent Application Publication No. 2006/0273686, the disclosure of which is incorporated herein by reference. A range of motor designs capable of high torque operation across a desired speed range that can move an aircraft wheel and function as described herein may also be suitable non-engine drive means. A high phase order electric motor of the kind described in, for example, U.S. Pat. Nos. 6,657,334; 6,838,791; 7,116,019; and 7,469,858, the disclosures of the aforementioned patents being incorporated herein by reference, may be effectively used as a non-engine drive means 36. One type of suitable electric drive motor 36 is a high phase order induction motor with a top tangential speed of about 15,000 linear feet per minute and a maximum rotor speed of about 7200 rpm, although drive motors capable of a wide range of such speeds may be used with the present clutch assembly and drive wheel drive system. Other non-engine drive means, including hydraulic and/or pneumatic drive motors, are also contemplated to be useful with the clutch assembly of the present invention.

The system housing 34 is specifically designed to operatively enclose the drive motor 36 and the drive system 38, as well as to operatively support the clutch assembly 40 as the clutch assembly is controlled to engage and disengage the drive system 38. FIG. 2 shows the clutch assembly 40 and other structures of the drive system 36 in greater detail than they appear in FIG. 1. The system housing 34 is designed to enclose and/or support the aircraft drive wheel drive system components completely within the space available in an aircraft landing gear drive wheel. The preferred system housing 34, shown in FIGS. 1 and 2, may be formed in sections, as shown, and may include an outboard section 50 that extends from the stationary element 44 of the drive means substantially parallel to the wheel wall 28 toward the wheel section 29 to form an outboard lip 52 that contacts and wraps around an outboard end 53 of the drive system 38. An inboard section 54 of the motor housing 34 may be angled from the stationary element 44 toward the horizontal upper wheel section 29 to form an inboard lip 56 that contacts and wraps around an inboard end 55 of the drive system 38. The inboard lip 56 may be interposed between an outer surface of the drive system inboard end 55 and the clutch assembly 40. A circumferential central system housing section 58 may be disposed between the housing outboard lip 52 and inboard lip 56 to contact an output surface 59 of the drive system. This preferred three-part arrangement of the system housing can also be seen clearly in the lower part of FIG. 1.

The drive system 38, which is positioned between the drive means 36 and the system housing sections 52, 56, and 58, is not shown in the lower part of the wheel 12 in FIG. 1, providing a clearer view of the system housing sections. It will be noted that circumferential gaps 60 may be provided between the central circumferential section 58 and the outboard and inboard lip portions 52 and 56 of the system housing to permit thermal expansion of housing sections during operation.

As discussed above, the inboard section 54 of the system housing may be angled to correspond to the asymmetric shape of the nonparallel inboard edges of the drive means elements 42 and 44 and the drive system 38, which provides an inboard recess 57 between the system housing wall 54 and the inboard wheel wall 30. The recess 57 may provide space to accommodate components of the clutch assembly 40. The inboard system housing section 54 and recess 57 could also direct and receive wiring (not shown) from the drive means elements, sensors, and/or other components that must be attached to wiring. This wiring may be a wire harness or other convenient wiring arrangement that ultimately connects the drive wheel components to the aircraft electrical system and/or a source of electrical power.

The drive system 38 is a system that performs essentially the same functions that would be performed by gearing or a gear system. The replacement of gearing by a drive system, particularly by a preferred roller traction drive system, in an aircraft drive wheel drive system presents many advantages. A roller traction drive system that is designed to actuate a drive motor capable of moving a commercial sized aircraft on the ground not only may have a low profile and be light weight, but it may also provide the high torque and high speed change ratio required to optimally operate the drive motor to move the aircraft on the ground. Unlike a gear system, a roller traction drive system has substantially zero backlash and can be made of dry running components that do not require lubrication. Planetary and other gear systems are capable of only limited gear ratios, while an infinite gear ratio is possible with a preferred roller traction drive system. A preferred roller traction drive system is, in addition, self-energizing. Other advantages of integrating a roller traction drive system with an aircraft drive wheel non-engine drive means to drive an aircraft wheel and move an aircraft on the ground can also be realized.

One type of roller traction drive system 38 particularly preferred for use in the aircraft drive wheel system of the present invention employs a series of rollers, preferably arranged in two rows and positioned within opposed motive surfaces or "races," so that a respective inner or outer row of rollers contacts an inner or outer race. The rollers, which are preferably hollow cylinders, contact the motive surfaces with pure rolling contact and low friction and, therefore, are highly efficient. Rollers have been found to function more efficiently than balls in a drive structure, although drive systems that employ balls are also contemplated to be within the scope of the present invention. Rollers, particularly hollow cylindrical rollers, do not demonstrate the high levels of friction and/or wear that characterize gears typically used to drive a motor or other drive means. In addition, traction and rigidity of a roller traction drive system may be varied as the number of rollers in a roller traction drive is varied, with increased numbers of rollers increasing traction and rigidity. A range of different configurations of roller traction drive systems and other drive systems that satisfy the parameters described above could be used to actuate a drive motor in an aircraft drive wheel to move the aircraft effectively and efficiently during ground operations.

The clutch assembly 40 of the present invention may be activated automatically or manually to engage and disengage the drive system 38 into and out of actuation with the drive motor 36 so that the drive motor is actuated to move an aircraft wheel to drive an aircraft on the ground or, when appropriate, de-actuated so that the drive motor is unable to drive the aircraft wheel. The drive system should only be engaged by the clutch assembly 40 to actuate the drive motor when the aircraft is actually on the ground, such as after landing and prior to takeoff, and when the aircraft is traveling at a desired speed during ground travel. Engagement and disengagement of the clutch assembly 40 could be targeted to the speed of the aircraft wheel 12 and/or to speeds of drive wheel system components, including the speed of the drive system 38. The present clutch assembly preferably includes one or more failsafe mechanisms, as described below, that prevent the clutch assembly 40 from engaging the drive system 38 when the aircraft landing gear wheels are not supporting the aircraft on the ground, such as, for example, when the aircraft is in flight and at other times when an aircraft landing gear wheel should not be driven.

The clutch assembly 40 may be located in an inboard portion of an aircraft wheel, such as within the recess 57 adjacent to the system housing inboard lip section 56 as shown schematically in FIG. 1 and in more detail in FIG. 2. Other locations within an aircraft wheel may also be more appropriate in some drive system configurations and are also contemplated to be within the scope of the present invention. A circumferential clutch assembly recess 82 may be provided in the wheel section 29 and may be configured to receive a correspondingly configured circumferential clutch component 80, which could be an outer race 94 as discussed below. This arrangement enables the clutch diameter to be press fit into the recess 82, if needed to ensure disengagement of the clutch assembly. A clutch assembly housing member 84 is provided adjacent to the recess 82 and may be positioned between the inboard wheel wall 30 and the drive system housing inboard wall 54 to enclose and support clutch assembly elements. The clutch assembly housing member 84 may include an extension 86 in contact with the system housing central section 58, which is shown adjacent to a drive system 38 output member 62. The clutch assembly 40 is preferably operably positioned so that it may move into and out of engagement with the drive system output member 62.

The clutch assembly may include both automatic and manual or override clutch control systems (not shown) to control operation of the clutch to engage or disengage the drive system 38. A fully automatic clutch control system that may be programmed to engage or disengage the clutch from the drive system with an automatic or manual override feature is preferred. When the drive system 38 is disengaged, the clutch control system may move the clutch assembly component 80 so that it is press fitted into the recess 82, preventing the clutch assembly from being in operable contact with the drive system 38, so that the drive system 38 cannot actuate the drive means 36. During engagement, the clutch assembly may be positioned outside recess 82 to be in operable contact with the drive system 38. The clutch assembly 40 may be any one of a number of clutch designs suitable for the purpose described.

Figure 3:
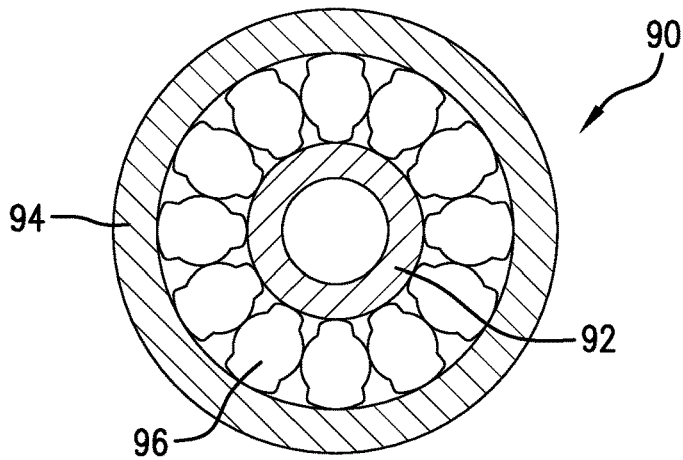
FIG. 3 is a schematic representation of one type of clutch element useful in a clutch assembly of the present invention.

One type of design for a clutch element 90 useful for the clutch assembly 40 of the present invention is shown in FIG. 3. This type of clutch element generally includes a circumferential inner race 92 spaced inwardly of a circumferential outer race 94, with a set of sprags or pawls 96 arranged between the inner race 92 and the outer race 94. The term "sprag" as used herein is also intended to include pawls and like elements. Each sprag 96 may be generally configured to allow free rotation of the inner race 92 when the inner race is rotated in a counterclockwise direction. When the inner race 92 is rotated in a clockwise direction, the sprags 96 transmit torque from the inner race 92 to the outer race 94. The clockwise rotation of the outer race 94 causes the outer race to move freely, while the counterclockwise rotation of the outer race 94 transmits torque from the outer race 94 to the inner race 92. In some applications, springs (not shown) may be included to exert a low level of rotary pressure on the sprags 96 to ensure that engagement of the freely moving race occurs without backlash.

There are many possible configurations of sprags, pawls, and like elements that may be used in a clutch assembly in accordance with the present invention. In a preferred arrangement of clutch element components according to another embodiment of the present invention, sprags are mounted on an inner race or rotatable clutch member, as described above, to pivot into and out of engaging contact with an outer race or rotatable clutch member attached to a drive system and drive motor or to an aircraft wheel. The assembly may also mount the sprags to pivot into or out of engagement with the aircraft wheel itself instead of an outer race or other rotatable clutch member.

The use of the terms "outer race" herein are intended to include an outer race, an outer race attached to a drive system or drive motor, or an aircraft wheel, and the aircraft wheel itself. Whichever structure is used as an outer race will function substantially as described above in connection with FIG. 3.

Figure 4A:
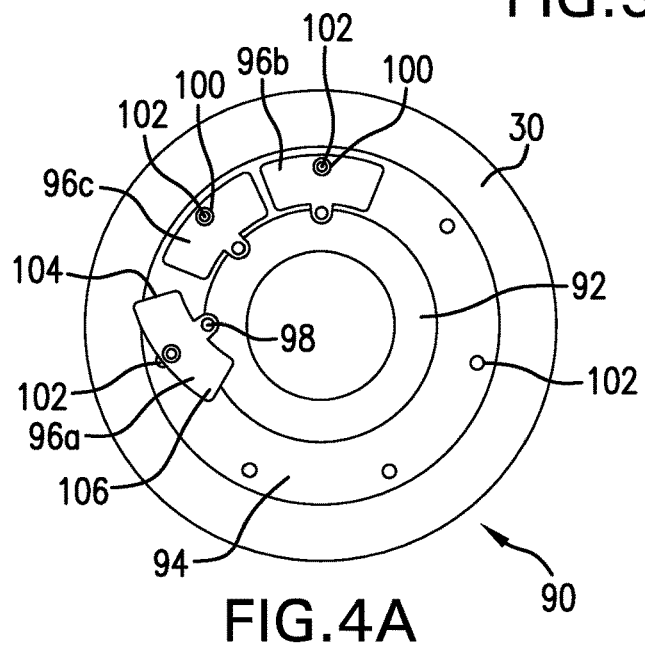
FIG. 4a is a schematic representation of a portion of another clutch element embodiment for the clutch assembly of the present invention.

In the clutch embodiment shown in FIG. 4a, the clutch components are arranged so that a plurality of sprags (96a, 96b, 96c) may be pivotally mounted on an inner race or clutch member 92 and can be indirectly or directly engaged on or disengaged from an aircraft wheel, depending, in part, on the direction of rotation of the aircraft wheel. Output torque from the clutch may be directed to the aircraft wheel 30, which may be attached to an outer clutch member or race 94, as described above. The number of sprags used can vary. For clarity of illustration, only three sprags, 96a, 96b, and 96c, are shown in FIG. 4a. Two of the sprags (96b, 96c) are shown engaged, and the third (96a) is shown out of engagement. For example, an arrangement of 6 to 10 circumferentially spaced sprags and suitable system software should avoid engagement shocks because speed differences between inner and outer races are likely to be small. Other numbers of sprags are also contemplated to be within the scope of the present invention.

Each sprag 96 may be shaped with the symmetrical configuration shown. A pivot mount 98 is provided to pivotally mount each sprag 96 on the inner race 92. A pin receptacle 100 is located on each sprag 96 to engage a correspondingly configured pin 102 on the outer race 94, a clutch member, or an adjacent portion of an aircraft wheel, such as wheel inboard wall 30 in FIGS. 1 and 2. The pins in FIG. 4a are located on the outer race 94. In this arrangement, slip rings (not shown) could also be included. The sprags 96 are mounted to pivot so that the pins 102 are either engaged by the receptacles 100 or are out of engagement with the receptacles 100.

Figure 4B:
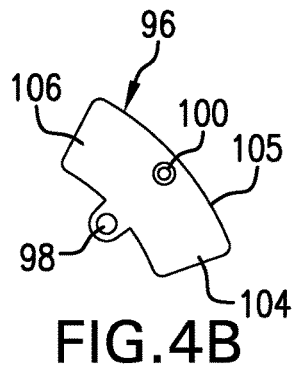
FIG. 4b shows a preferred sprag or pawl configuration for the FIG. 4a embodiment of the present invention.

The sprags 96 may be designed to have a shape that prevents their improper engagement on the pins 102 and that enables them to change direction when the driven direction of the aircraft wheel 12 changes. A preferred sprag configuration is shown in FIG. 4b. Each sprag 96 may include a first fin 104 and a second fin 106 at opposed extents of the sprag on either side of the pin receptacle 100. A curved edge 105, which connects the fins 104 and 106, preferably conforms to the radius of curvature of the outer race 94 or other curved structure in which the pins 102 are positioned. The opposed edges of fins 104 and 106 may be angled.

In one variation of sprag configuration, one of the fins 104 or 016 may be formed to be heavier than the other fin and may be installed on the outer race 94 so that the heavier fin is oriented toward the direction in which the aircraft will travel when it is driven in reverse by the drive motor 34. This causes the heavier fin to pivot away from the pin 102 and the opposite fin to move toward the inner race 92 or toward another central structure in a default position. As a result, the forces of inertia and gravity may be used to move the sprag 96 into a disengaged position. Sprag 96a in FIG. 4a is shown in the default position. The heavier fin 104 has caused the sprag 96a to pivot out of engagement with the pin 102. Sprags 96b and 96c, in which each of the pin receptacles 100 engages a pin 102, are shown in an engaged position.

Figure 4C:
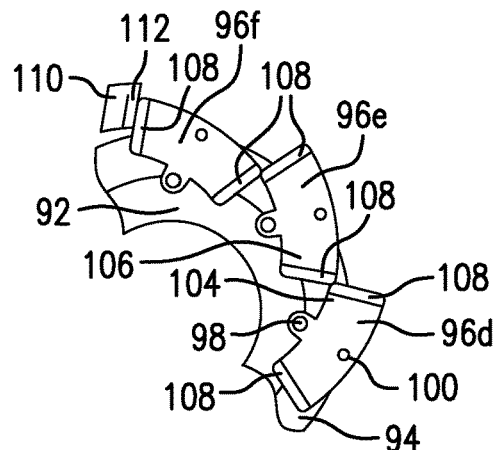
FIG. 4c shows a variation of the FIG. 4a embodiment of the clutch assembly of the present invention, wherein disengagement of the clutch assembly can be monitored and confirmed.

An additional variation of this embodiment of the present clutch assembly is shown in FIG. 4c. As discussed above, engagement of the drive system and actuation of the non-engine drive motor to drive an aircraft should occur only when the aircraft is moving at a desired optimum or selected speed during ground travel and never during flight or at other times when operation of the drive system would be unsafe. To ensure that the clutch assembly is disengaged or is engaged only when appropriate, each sprag 96 may be provided with an electrical contact element 108 at the extent of the opposed edge of each of the fins 104 and 106, as shown. When the sprags 96d, 96e, and 96f are in the positions shown in FIG. 4c, they are not in engagement with the pins 102, and, therefore, cannot engage the drive system 38. When the sprags are in these positions, an electrical contact 108 on a fin 104 of sprag 96d contacts an electrical contact 108 on a fin 106 of adjacent sprag 96e. Likewise, an electrical contact 108 on fin 104 of sprag 96e contacts an electrical contact 108 on fin 106 of sprag 96f. A sensor 110 is provided with a corresponding electrical contact 112, so that electrical contact 108 on fin 104 contacts the electrical contact 112 on the sensor 110, completing an electrical circuit and indicating that all of the sprags are in a neutral, non-engaged position. An electric coil (not shown) associated with the clutch assembly, when energized, causes a drag on the sprags to move them into engagement, which requires an electric drive element or other source of electric power to be in communication with the sprags. When the sprags are in a neutral position as described above, and an electric current can flow through the plurality of sprags, this flow of electric current indicates that the clutch is disengaged. That information may be communicated to a central logic controller (not shown) and to the aircraft cockpit to indicate that the clutch assembly is fully disengaged, which means that the aircraft drive wheel drive system is also disengaged and unable to move the aircraft autonomously on the ground.

In the embodiment shown FIG. 4c, the sprags 96 may be mounted on an inner race 92 so that the electrical contacts 108 on adjacent fins 104 and 106 are spaced apart and cannot make electrical contact when the clutch assembly is engaged to activate the drive system.

Other arrangements of sprags and associated structures may be employed in a clutch assembly according to the present invention to prevent engagement and provide a failsafe function to prevent an aircraft drive wheel drive system from operating when conditions are not appropriate or safe for its operation. Such arrangements are contemplated to be within the scope of the present invention. For example, there may be springs (not shown) associated with each sprag that can be set to cause the sprag to disengage from a pin or other engaging structure when torque drops to a selected level and then to return to a neutral position when the drive system stops. Sprags could also be oriented to be engaged or disengaged using the speeds or comparative speeds of various system components. The speed of the aircraft wheel 12, the drive motor rotor 42, and/or the speed of the drive system 38 could be used either alone or as compared to one of the other component speeds. In one example, the clutch assembly sprags would engage only if the rotor speed or drive system speed exceeded the wheel speed when the wheel and aircraft are traveling in either a forward or a reverse direction. A limited degree of stator wobble could also be used as a basis for orienting the sprags to engage.

In an additional clutch assembly variation that is not shown, a pair of spherical bearings may be positioned on opposite sides of each sprag 96 to help align the inner and outer races or clutch members 92 and 94. This arrangement could increase the torque capacity and reliability of the clutch assembly.

To address concerns with uneven stiffening and/or stresses on drive system 38 output member 62, one or more crowned gear segments, such as crown gear 120 in FIG. 2, may be provided. A mating straight cut gear (not shown) may be integrated with the drive system output member 62 to neutralize most stiffening of the output member 62. In one possible arrangement (not shown), two crowned gear segments may be held by a coupling tube to meet two straight cut gears. In this arrangement, the coupling tube requires only two flex points. Other arrangements that reduce the effects of stiffening and/or stress on the drive system output member or other components are also contemplated to be within the scope of the present invention.

It is preferred that the present clutch assembly be designed to withstand high torque loads, preferably torque loads in excess of a determined maximum torque load for the drive wheel drive system.

While the present invention has been described with respect to preferred embodiments, this is not intended to be limiting, and other arrangements and structures that perform the required functions are contemplated to be within the scope of the present invention.

INDUSTRIAL APPLICABILITY

The clutch assembly of the present invention will be most useful for engaging a roller traction or other drive system to actuate a drive motor in an aircraft drive wheel to move an aircraft wheel and an aircraft autonomously on the ground and will find its primary applicability where it is desired to realize the benefits of moving an aircraft very efficiently on the ground without reliance on the aircraft's main engines or external ground vehicles.

The invention claimed is:

1. A clutch assembly for an aircraft landing gear drive wheel drive assembly designed to efficiently move an aircraft autonomously during ground operations without reliance on aircraft main engines or external vehicles, comprising:
   a drive wheel drive assembly mounted completely within a space and volume formed by inboard and outboard wall sections in one or more nose or main landing gear wheels, said drive wheel drive assembly comprising at least a drive motor operable and controllable to drive said one or more landing gear wheels at a desired speed and torque without reliance on aircraft main engines and external vehicles, a drive system in actuating and torque transfer contact with said drive motor, and a clutch assembly automatically or manually controllable to selectively engage and disengage an output member of said drive system into and out of actuating contact with said drive motor in response to selected operating or environmental conditions, wherein said drive motor and said drive system are enclosed within a housing supported within said space and volume formed by said inboard and outboard landing gear wheel wall sections; and
   said clutch assembly is fitted for engagement or disengagement with said drive system output member within said space and volume adjacent to said housing and comprises a circumferential inner clutch member, a circumferential outer clutch member spaced outwardly of said inner clutch member in selectively activating contact with said drive system output member, and a plurality of pivotally mounted controllable clutch engagement elements spaced circumferentially around said inner clutch member to avoid engagement shocks and shaped to selectively transmit torque between said inner clutch member and said outer clutch member and said drive system.

2. A clutch assembly for an aircraft drive wheel drive assembly designed to efficiently move an aircraft autonomously during ground operations without reliance on aircraft main engines or external vehicles, comprising:
   an aircraft drive wheel drive assembly mounted completely within a housing in one or more nose or main landing gear wheels to control rotation of said one or more wheels, comprising at least a drive motor to drive said one or more wheels at a desired speed and torque, a drive system in actuating and torque transfer contact with said electric drive motor, and a clutch assembly automatically or manually controllable to selectively engage and disengage an output member of said drive system into and out of activating contact with said drive motor in response to selected operating or environmental conditions; and
   said clutch assembly is fitted for engagement or disengagement with said drive system output member within said one or more wheels adjacent to said housing and comprises a circumferential inner clutch member, a circumferential outer clutch member spaced outwardly of said inner clutch member in selectively actuating contact with said drive system, and a plurality of pivotally mounted controllable clutch engagement elements spaced circumferentially around said inner clutch member and shaped to selectively transmit torque between said inner clutch member and said outer clutch member and said drive system, wherein said plurality of engagement elements is selected and spaced to avoid engagement shocks, and wherein each of said plurality of engagement elements comprises a sprag with a pin receptacle pivotally mounted on said inner clutch member to pivot between an engaged position releasably engaging a corresponding engagement pin on said outer clutch member to transmit torque to said outer clutch member and a disengaged position disconnected from and out of torque transfer contact with said outer clutch member.

3. The clutch assembly of claim 2, wherein each said sprag is sized and shaped so that said plurality of sprags fits around a circumference of said outer clutch member when said plurality of sprags are in torque transmitting engagement with said outer clutch member.

4. The clutch assembly of claim 3, wherein each of said plurality of sprags comprises a pair of opposed symmetrical fins connected by a curved web to extend from a central pivot on said curved web circumferentially along said inner and outer clutch members and each of said plurality of sprags is pivotally mounted on said inner clutch member so that an edge of the symmetrical fin of one sprag is spaced apart from an adjacent edge of the symmetrical fin of each adjacent sprag.

5. The clutch assembly of claim 4, wherein one of said pair of opposed symmetrical fins on each of said plurality of sprags is formed to be heavier than the other of said pair of symmetrical fins.

6. The clutch assembly of claim 1, wherein said clutch assembly further comprises a sensor, said plurality of engagement elements comprises a plurality of sprags sized and shaped so that said plurality of sprags fits around a circumference of said outer clutch member when said sprags are in torque transmitting engagement with said outer clutch member, and each of said plurality of sprags comprises a pair of opposed fins connected by a curved web to extend from a central pivot on said curved web circumferentially along said inner and outer clutch members; wherein each of said pair of fins on each of said plurality of sprags comprises an electrical contact positioned to contact an electrical contact on a fin of an adjacent sprag when said plurality of sprags are pivoted out of engagement with said outer clutch member; and wherein an electrical contact on a fin of one sprag contacts an electrical contact on said sensor to complete an electric circuit when said plurality of sprags are out of torque transmitting and engaging contact with said outer clutch member and an electric current is controllably supplied to said clutch assembly.

7. The clutch assembly of claim 2, wherein said outer clutch member is attached to said one or more wheels, said engagement pin is located on said one or more wheels, and said plurality of sprags are circumferentially spaced to transmit torque between said inner clutch member and said one or more wheels when said sprag pin receptacle engages a corresponding engagement pin on said one or more wheels.

8. The clutch assembly of claim 1, wherein said clutch assembly further comprises at least one pair of mating gears in contact with said output element of said drive system and at least one gear in said at least one pair of mating gears comprises a crown gear.

9. The clutch assembly of claim 8, wherein said drive motor comprises an electric drive motor, said drive system comprises a roller traction drive in actuating communication between said clutch assembly and said electric drive motor.

10. The clutch assembly of claim 4, wherein the said plurality of said sprags comprises an arrangement of 6 to 10 of said sprags pivotally mounted circumferentially on said inner clutch member.

* * * * *